Figure 1:
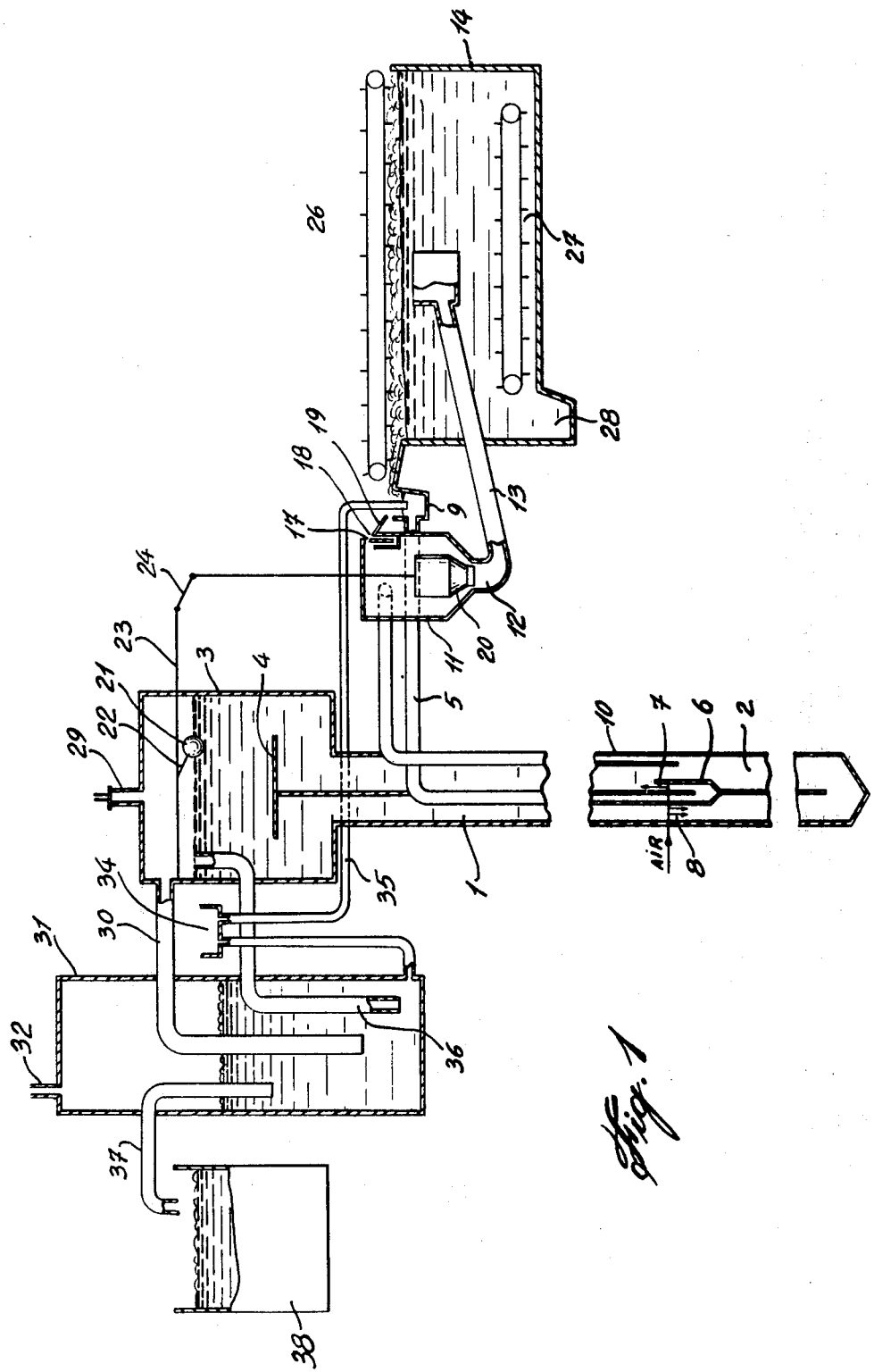

United States Patent [19]

Pollock

[11] 4,272,379
[45] Jun. 9, 1981

[54] METHOD FOR PROTECTING A BIOREACTOR PRESSURIZED HEAD TANK AGAINST EXTREME SURGES OF INFLUENT WASTE WATER

[75] Inventor: David C. I. Pollock, Richmond Hill, Canada

[73] Assignee: C-I-L Inc., Montreal, Canada

[21] Appl. No.: 159,349

[22] Filed: Jun. 13, 1980

[30] Foreign Application Priority Data

Oct. 26, 1979 [CA] Canada ................................. 338540

[51] Int. Cl.³ .............................................. C02F 3/22
[52] U.S. Cl. .................................. 210/621; 210/629; 210/130; 210/195.3; 210/220; 137/571
[58] Field of Search ............... 210/608, 621, 622, 623, 210/626, 627, 629, 741, 744, 97, 104, 109, 123, 128, 129, 130, 132, 195.1, 195.3, 220, 221.2, 744; 137/571, 593

[56] References Cited

U.S. PATENT DOCUMENTS

| 3,301,779 | 1/1967 | Kovacs | 210/221.2 |
|---|---|---|---|
| 3,576,738 | 4/1971 | Duffy | 210/221.2 |
| 3,821,107 | 6/1974 | Peoples | 210/622 |
| 3,831,758 | 8/1974 | Watson | 210/221.2 |
| 4,069,149 | 1/1978 | Jackson | 210/608 |
| 4,086,160 | 4/1978 | Roesler | 210/629 |
| 4,137,062 | 1/1979 | Mullerheim | 210/617 |
| 4,138,328 | 2/1979 | Schnitzler | 210/220 |
| 4,217,211 | 8/1980 | Crane | 210/629 |
| 4,230,563 | 10/1980 | Roesler | 210/629 |

FOREIGN PATENT DOCUMENTS

| 1033081 | 6/1978 | Canada. | |
|---|---|---|---|
| 54-120953 | 9/1979 | Japan | 210/221.2 |
| 1473665 | 4/1974 | United Kingdom | 210/629 |

OTHER PUBLICATIONS

Proceedings of the 31st Industrial Waste Conference, May 4, 5, 6, 1976, Purdue University, Ann Arbur Science, USA, p. 344–351.
"Breakthrough in Sewage Treatment", Water Services, Apr. 1975, pp. 132, 140.

Primary Examiner—Ernest G. Therkorn
Attorney, Agent, or Firm—Donald G. Ballantyne

[57] ABSTRACT

A method and apparatus is provided whereby a pressurized long vertical shaft bioreactor is protected against extreme surges of influent waste liquid. The method provides for the transfer of excess waste from the top of the bioreactor head tank to an adjacent collection vessel where, in response to the pressure created in the bioreactor, the collected waste is caused to overflow and is returned to the influent waste stream. The method permits the return of waste from the reactor to the influent stream while bypassing the normal circulation route through the reactor. Simplification of control is provided and float or level control valves may be eliminated thereby reducing construction, operating and maintenance costs.

4 Claims, 2 Drawing Figures

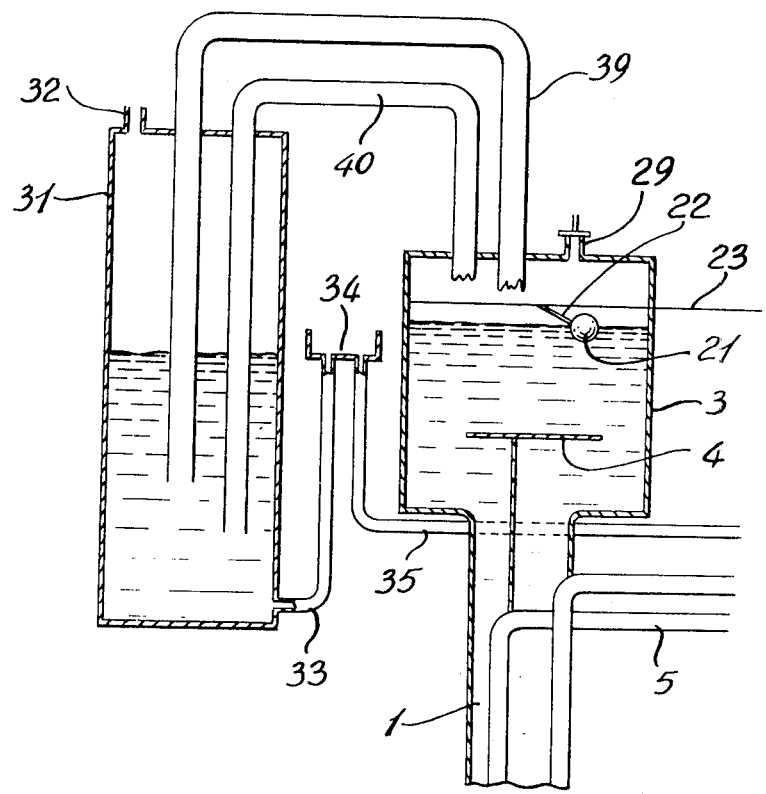
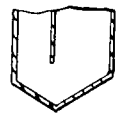
Fig. 2

METHOD FOR PROTECTING A BIOREACTOR PRESSURIZED HEAD TANK AGAINST EXTREME SURGES OF INFLUENT WASTE WATER

This invention relates to a method for protecting a long vertical shaft bioreactor against the effects of extreme surges of influent waste water.

Long vertical shaft bioreactors suitable for the treatment of waste water by a modified activated sludge process are known, being disclosed for example in Canadian Pat. No. 1,033,081 to Bailey et al. Such bioreactors comprise a circulatory system including at least two substantially vertical chambers communicating with each other at their upper and lower ends, the upper ends being connected to a basin. The waste water is caused to descend one chamber (the downcomer) and ascend the other chamber (the riser). Normally, the waste water is circulated through the bioreactor system by injection at depth of an oxygen-containing gas, usually air, into one or both of the chambers. Typically in a bioreactor having a depth of about 500 feet and employing air at a pressure of 100 pounds per square inch, air injection is made at a depth of about 200 feet. At the start up of the bioreactor, the injection will be into the riser chamber where it acts in the nature of an air lift pump. Once circulation of the waste water begins, an injection can be limited to the downcomer chamber since the fluid in the downcomer, having a higher density than the liquid/bubble mixture of the riser, provides sufficient force to maintain circulation. Influent waste water is conveniently introduced into the basin at a position near to the upper end of the downcomer. Treated waste water is drawn off from the basin at a position near to the upper end of the riser. Usually the basin is fitted with a baffle which causes the circulating waste water leaving the riser to traverse a major part of the basin before again ascending the downcomer.

The injected oxygen-containing gas dissolves in the waste water as the water descends to regions of greater hydrostatic pressure in the downcomer chamber. The dissolved oxygen constitutes the principal reactant in the biochemical degradation of the waste. As the circulating waste water rises in the riser chamber to regions of lower hydrostatic pressure, dissolved gas comes out of solution forming bubbles. When the liquid/bubble mixture from the riser enters the basin gas disengagement occurs. Reaction between waste water, dissolved oxygen, nutrients and biomass takes place during circulation through the downcomer, riser, basin system. The products of the reaction are carbon dioxide, and additional biomass which, in combination with inert material present in the influent waste water, forms a sludge.

The term waste water is understood to include water carrying any type of biodegradable domestic and industrial waste materials, for example, normal domestic waste from municipal sewer systems and the effluents produced by farms, food factories and other industries.

In our co-pending Canadian Patent Application entitled "Long Vertical Shaft Bioreactor with Pressurized Head Tanks" and filed concurrently herewith there is disclosed a modified long vertical shaft bioreactor in which the surface basin connecting the downcomer and riser is enclosed, forming a pressurized head tank. Influent waste water is introduced at some depth into the riser chamber of the disclosed pressurized system through the outlet of an influent duct located in the riser. An oxygen-containing gas is also injected into said influent duct close to its outlet. In addition to oxygenating the waste, the injected gas acts as a lift pump which carries influent waste into the bioreactor riser. Effluent is withdrawn from the riser chamber through an effluent duct which has its inlet located at a position below the outlet of the influent duct. Flows of influent to, and of effluent from the bioreactor are controlled in response to the level of liquid in the basin head tank. When the liquid level rises, a valve in the effluent system is caused to open, allowing effluent to leave the bioreactor. When the liquid level falls, said valve closes, causing effluent to be returned to the influent duct.

Although the above-described pressurized bioreactor operates satisfactorily under normal conditions, problems in operation can occur when the bioreactor is subjected to extreme changes in influent flow of waste water. Such extremes in flow can occur, for example, as the result of the diurnal peaks in the flow of municipal waste water. For example, a surge of waste water entering the bioreactor through the influent duct can impose on this duct an additional pressure of several feet of water. As a result, the air lift pump near the exit of the influent duct will carry into the riser chamber a volume of water in excess of the outflow capacity of the effluent duct. This will occur because the elevation or hydraulic head of the effluent duct remains constant. As a result of the increase of volume of liquid in the bioreactor, the liquid level in the head tank rises and in response, the control valve in the effluent line opens allowing maximum effluent to discharge from the system. However, during period of peak flow, this discharge will not equal the flow rate through the influent duct. As the level liquid in the head tank continues to rise, sufficient back pressure will develop to increase the flow in the effluent duct and decrease the flow in the influent duct. In time, the influent and effluent flows will again become equal. This equalling, however, will require a provision for an increased volume and increased head of several feet of liquid in the head tank.

A modification of the pressurized head tank disclosed in our copending application has now been devised which protects the bioreactor against the problems associated with extreme surges in flow of influent waste water. The modification provides a means for smoothing out surges of waste water flow to a long vertical shaft bioreactor.

The modified bioreactor of this invention comprises an enclosed head tank, a downcomer and a riser operatively communicating with each other at their upper and lower extremities, communication at the upper extremities being through the head tank, means for directing influent waste to said riser, means for removing effluent waste from said riser, means for injecting an oxygen-containing gas into the waste within said riser and downcomer and gas conduit means in said head tank for venting gas therethrough into an adjacent collection vessel, the end of said gas-venting conduit in said collecting vessel being immersed in a predetermined depth of waste liquid in the said collection vessel, liquid conduit means in said head tank for venting liquid therethrough into the said adjacent collection vessel, the end of the said liquid venting conduit being immersed in the said collection vessel liquid at a lower level than the end of said gas-venting conduit, the said collection vessel having overflow conduit means for transferring waste liquid from the said collection vessel to the bioreactor influent stream, said overflow conduit means being positioned to control the level of liquid in said collection vessel, thereby controlling the pressure on the gas vented from the said head tank.

The means for transferring excess liquid from the enclosed head tank to the collecting vessel comprises a venting duct operatively connecting the head tank to the collecting vessel, the inlet of said liquid venting duct being located substantially at the normal level of liquid in the head tank, and the outlet of the duct being located at a predetermined depth below the outlet end of the gas-venting duct which is also submerged in liquid in the collecting vessel. Thus, since the outlet of the liquid-venting duct is lower than the outlet of the gas-venting duct in the collecting vessel, only liquid can flow through the liquid-venting duct.

If a surge of influent waste water is directed into the bioreactor resulting in a rise in level in liquid in the head tank, the normal control system will function to direct effluent to the solid separation means, usually a flotation or sedimentation tank. However, if this normal response is not sufficient to control the surge, excess liquid will flow from the head tank through the liquid-venting duct into the adjacent collecting vessel. The collecting vessel (into which gas from the head tank is also vented) is fitted with an overflow leading to the influent duct of the bioreactor. Thus excess liquid from the head tank is returned to the influent system directly without passage through the downcomer/riser system of the bioreactor.

In a alternative arrangement, a modification of the liquid-venting duct can be provided in the form of twin inverted J-shaped pipes connecting the head tank to an adjacent collecting vessel. The short arms of the J-shaped pipes are connected to the top of the head tank at positions above the normal operating liquid level, the arm of one being longer and descending closer to the liquid level than the arm of the other. The long arms of the J-pipes are immersed at different depths beneath the surface of the liquid in the adjacent collecting vessel, the J-pipe with lesser depth of immersion having its corresponding short arm descending closest to the surface of the liquid in the head tank. Thus gas vented from the head tank will pass through the J-shaped pipe having the lesser depth of immersion in the adjacent vessel. However, if the liquid level in the head tank rises to the position of the opening of the longer of the two short arms of the J-shaped pipe, gas will no longer be able to pass through the J-shaped pipe having the lesser depth of immersion in the adjacent collecting vessel. Thus with an inflow surge of waste to the bioreactor, the pressure in the head tank will rise by an amount equivalent to the difference in head between the two openings of the immersed long arms of the J-shaped pipes. This increased pressure in the head tank will exert increased pressure on the fluid in the effluent duct causing increased flow of effluent from the bioreactor and thus equalize the system.

In the event that the afore-described overflow system from the head tank to the collecting vessel is insufficient to carry the surge of liquid from the head tank, it is convenient to fit said collecting vessel with a second overflow conduit emptying into a secondary tank. The inlet of said overflow is positioned beneath the surface of the liquid in said collecting vessel so that only liquid and not foam or gas will flow into the equalization tank. The contents of the equalization tank can then be fed controllably to the influent duct of the bioreactor.

The invention is illustrated in the accompanying drawings wherein

FIG. 1 is a diagrammatic elevation of a long vertical bioreactor system fitted with the head tank by-pass circuit of this invention, and FIG. 2 is a diagrammatic elevation showing an alternative embodiment of the invention.

Referring to FIG. 1, at 1 is shown a downcomer, at 2 a riser, both communicating with a pressurized head tank 3. Head tank 3 is fitted with baffle 4 that directs the flow from riser to downcomer across the surface of the head tank. Waste water is introduced into riser 2 through influent duct 5. The outlet of duct 5 is fitted with an upwardly directed U-shaped exhaust member 6 fitted with a sparger 7 for the injection of an oxygen-containing gas (usually air), into the influent duct. The gas serves to oxygenate the waste water and also to form an air lift pump forcing influent into riser 2. A second sparger 8 injects an oxygen-containing gas into downcomer 1. Feed of waste water to influent duct 5 is from influent trough 9 into which the incoming waste stream (not shown) to be treated is received. Effluent is taken off riser 2 through effluent duct 10 whose inlet is located upstream from the opening of exhaust member 6. The outlet of effluent line 10 discharges tangentially into cylindrical vessel 11 which is fitted with base opening 12 discharging into duct 13 leading to flotation tank 14. Cylindrical vessel 11 has a second exhaust opening 17, controlled by adjustable weir 18. Effluent flowing through 17 passes over weir 18 and chute 19 into inlet trough 9. Relative flow through openings 12 and 17 is controlled by plug valve 20. The position of valve 20 is varied in response to changes in level of liquid in head tank 3 as measured by float 21. Float 21 is carried by arm 22 affixed to rotatable shaft 23. To the external end of shaft 23 is attached bell crank 24, the end of bell crank 24 being connected to rod 25 supporting plug valve 20. Thus as float 21 rises plug valve 20 rises increasing the discharge of effluent to flotation tank 14. Flotation tank 14 is fitted with two scrapers 26 and 27. Scraper 26 transfers floating sludge to influent trough 9 for transfer to and further treatment in the bioreactor. Likewise scraper 27 transfers sedimented material to trough 28 from which it in turn is pumped by means not shown to influent trough 9.

Pressurized head tank 3 is shown fitted with a pressure relief valve 29 but gas and foam present in tank 3 is normally vented through vent duct 30. Duct 30 discharges below the level of the waste liquid in collecting vessel 31 thus maintaining a back pressure on head tank 3. Collecting vessel 31 is fitted with gas vent 32. Liquid collecting in vessel 31 as the result of the collapse of foam carried over from the head tank can overflow through line 33 by way of overflow pot 34 emptying into line 35 that discharges into influent trough 9. Thus the contents of vessel 31 are recycled through the bioreactor.

The means for controlling surges of liquid in the bioreactor and in head tank 3 is liquid-venting duct 36. Duct 36 has its inlet located at the normal operating liquid level in head tank 3. The outlet of liquid-venting duct 36 is positioned below the outlet of gas-venting tube 30. Thus only liquid will flow through duct 36. Surges of liquid to head tank 3 thus will pass through liquid-venting duct 36 to vessel 31 and will normally then overflow through lines 33 and 35 to influent trough 9. However, in the event that the normal overflow ducts 33, 35 cannot carry an extreme surge of fluid, tank 31 is fitted with an auxiliary overflow duct 37 discharging into secondary tank 38. The inlet of overflow duct 37 is submerged beneath the liquid level in collecting vessel 31 in order to prevent floating foam from passing to the secondary tank. From secondary tank 38 liquid can be fed gradually by conduit means (not shown) to influent trough 9 thereby smoothing the effect of surges in influent flow.

Referring to FIG. 2, a second embodiment of the liquid venting duct is shown in which the connection between head tank 3 and adjacent collecting vessel 31 is by twin inverted J-shaped pipes 39 and 40. The short arm of pipe 39 is connected to the top of head tank 3 and has an arm that descends to a predetermined distance above the normal level of liquid in the head tank. The long arm of pipe 39 is immersed in liquid in adjacent collecting vessel 31. The short arm of pipe 40 is also connected to the top of head tank 3 but with its opening above the opening of the short arm of pipe 39. The long arm of pipe 40 is immersed in liquid in adjacent collecting vessel 31 with its opening located below the opening of the long arm of pipe 39. Thus gas vented from head tank 3 will pass through pipe 39 since the back pressure on 39 is less than on pipe 40. The difference in back pressure is equivalent to the difference in head between the submerged openings of pipes 39 and 40. Thus if a surge in influent waste water raises the level of liquid in head tank 3, the inlet of pipe 39 will be blocked increasing the back pressure on head tank 3. The increased pressure in head tank 3 will cause increased flow of effluent through effluent duct 10.

The improved apparatus of this invention smooths out the effects of surges of influent flow by the device of sending excess liquid from the head tank back to the influent stream bypassing the normal route through the downcomer/riser circuit. Control of surges in flow has the additional advantage of simplifying the operating of the valve controlling flow in the effluent line.

EXAMPLE

Employing a long vertical shaft bioreactor of 16 foot diameter and 500 foot depth similar to that shown in FIG. 2, the two inverted J-tubes 39 and 40 were installed as follows: Tube 39 was 8" diameter and tube 40 was 6" diameter and tube 40 had 18" greater submergence depth in vessel 31 than tube 39. In head tank 3, J-tube 39 was 3" longer than tube 40 and both ends of each tube had saw-tooth shaped ends 6" long from root to crest. Influent was introduced to the bioreactor at the rate of 130,000 IGPD which flow was sufficient to maintain a level in head tank 3 of 30" with 1" submergence on the teeth of the head tank end of J-tube 39. Inflow was rapidly increased by adjusting a gate on the influent pipe (less than 30 seconds) to approximately 200,000 IGPD at time 0. The head tank level rose gradually over a period of 10 minutes from 30" to 36" thereby choking off air flow in tube 39. The air flow was thereby transferred to exposed tube 40. As the liquid gradually rose on the teeth of tube 39, head tank pressure rose from 1.1 psig to 1.75 psig in 4 minutes. An outflow response to changing head tank pressure was measured on the effluent take-off line 10. The desired peak of 200,000 IGPD was reached in 8 minutes. Correspondingly, as pressure rose in head tank 3, the influent channel backed up due to increased internal pressure in the bioreactor shaft and due to increased hydraulic loss due to flow change. The datum for the level in the influent channel is 73" below head tank bottom. The influent trough level rose 49" over a period of 25 minutes.

By using the described type of J-tube configuration, rapid changes in influent flow can be smoothed out within the shaft and head tank 3. Furthermore, this arrangement of J-tubes causes rapid increases in pressure in head tank 3 with corresponding changes in velocity and flow in the outflow channel 10. This is accomplished without the use of float control or plug valve.

The embodiments of the invention in which an exclusive property or privilege is claimed are defined as follows:

1. An improved long vertical shaft bioreactor apparatus comprising an enclosed head tank, a downcomer chamber and a riser chamber operatively communicating with each other at their upper and lower extremities, communication at the upper extremities being through the said head tank, means for directing influent waste to said riser, means for removing treated effluent from said riser, means for injecting oxygen-containing gas into the waste within said riser and downcomer, the improvement comprising gas conduit means in the said head tank for venting gas therethrough into an adjacent collection vessel, the end of said gas-venting conduit in said collection vessel being immersed in a predetermined depth of waste liquid in the said collection vessel, liquid conduit means in said head tank for venting liquid therethrough into the said adjacent collection vessel, the end of said liquid venting conduit being immersed in the said collection vessel liquid at a lower level than the end of said gas-venting conduit, the said collection vessel having overflow conduit means for transferring waste liquid therefrom to the bioreactor influent steam, said overflow conduit means being positioned so as to control the level of liquid in the said collection vesel thereby controlling the pressure exerted by the said liquid upon the gas vented from the said head tank.

2. An apparatus as claimed in claim 1 wherein the inlet of the said liquid venting conduit in said head tank is positioned substantially at the normal operating level of liquid in the said head tank.

3. An apparatus as claimed in claim 1 wherein the said gas venting conduit and the said liquid venting conduit comprise inverted J-shaped ducts extending from said head tank to said collection tank.

4. A method of protecting a long vertical shaft pressurized bioreactor against the effect of surges of influent waste liquid comprising the steps of transferring excess liquid waste from the said pressurized bioreactor to an adjacent collection vessel, the rate of flow of said excess waste from the said bioreactor to the said collection vessel being proportional to the pressure within the said bioreactor and collection vessel and returning the said excess waste from the said collection vessel to the bioreactor waste influent stream.

* * * * *